Patented Dec. 11, 1928.

1,695,068

UNITED STATES PATENT OFFICE.

ALFRED PAUL THOMPSON, OF JACKSON HEIGHTS, NEW YORK, ASSIGNOR TO GENERAL CHEMICAL COMPANY, OF NEW YORK, N. Y., A CORPORATION.

METHOD OF PRODUCING ELEMENTAL SULPHUR.

No Drawing.   Application filed December 16, 1926. Serial No. 155,349.

This invention relates to a process of producing elemental sulphur from sulphurous gases, and particularly to a process of producing elemental sulphur by the reduction of sulphur dioxide with solid carbonaceous fuel.

In the heretofore known processes for reducing sulphur dioxide with carbonaceous fuel certain difficulties in operation have been encountered, more particularly with respect to the control of the temperature in the reduction chamber. With gas mixtures containing comparatively small amounts of sulphur dioxide, and proportionately large amounts of oxygen resulting from the roasting of sulphide ores, smelting processes, etc., it has been found that the heat evolved by the combustion of the reducing fuel with the large amount of free oxygen present in the mixture is greatly in excess of that required to maintain the proper temperature for the simultaneous reduction of the sulphur dioxide. This is true even when substantially all the carbon dioxide produced in the combustion is reduced by more carbonaceous fuel to yield carbon monoxide. This excess heat evolved cannot readily or economically be utilized in the reduction chamber and yet it is necessary that it be dissipated quickly to prevent a temperature rise above the point where the ash and cinder from the fuel would fuse and clinker. It has been proposed to prevent such fusion by the addition of steam to the reaction zone whereby the excess heat is utilized by the decomposition of the water. The procedure is not satisfactory, however, since the introduction of hydrogen in any form into the system increases the amount of hydrogen sulphide in the products of the reduction, and this hydrogen sulphide is difficult to eliminate or to treat in such a manner as to completely recover the sulphur therefrom. Another proposed method for obviating this difficulty consists in concentrating the sulphur dioxide to be reduced thereby eliminating the admixed oxygen. This procedure, while effective, is expensive to operate.

The objects of my invention are—first, to provide a process whereby gases containing small amounts of sulphur dioxide may be treated to recover the elemental sulphur; second, to provide a process wherein the excess heat developed in the reduction of the sulphur dioxide may be efficiently utilized; third, to provide a process wherein the danger of fusing or clinkering the ash from the reducing fuel is practically eliminated.

My invention consists in causing an endothermic reaction to take place in the reduction chamber simultaneously with the reduction of the sulphur dioxide, such endothermic reaction, however, yielding substantially no hydrogen either free or combined. More particularly my invention consists in mixing with the gas containing the sulphur dioxide to be reduced, controlled amounts of a gas substantially free from uncombined oxygen but containing considerable amounts of carbon dioxide, or introducing into the reduction chamber a substance adapted to yield carbon dioxide upon heating, whereby the carbon dioxide is converted to carbon monoxide by reaction with the carbonaceous fuel with the utilization of the excess heat in the reduction chamber, and the carbon monoxide produced is subsequently utilized in the reduction of more sulphur dioxide or in the generation of heat under such conditions that it may be efficiently employed.

As above stated, the difficulties heretofore encountered in the reduction with carbonaceous fuel of sulphur dioxide in the form of smelter or roaster gas occur when such gas mixtures contain comparatively small amounts of sulphur dioxide and proportionately large amounts of oxygen. The less the proportion of sulphur dioxide and correspondingly the greater the proportion of oxygen in the gas being treated, the greater is the excess of heat. I have found by experiment that gases obtained by roasting or smelting pyrites with air for example which contain less than about 7% sulphur dioxide, and consequently more than about 11% oxygen, i. e. where the ratio of sulphur dioxide to free oxygen is less than about 1:1.6, develop an excess of heat when they are contacted with carbonaceous fuel at commercial gas speeds, (i. e. such gas speeds as are normally employed in producer gas practice). The excess of heat thus developed must therefore be quickly dissipated, since otherwise the temperature rises in a reduction chamber to such an extent that the ash and cinder will fuse.

In order to utilize this excess heat efficiently and to prevent the fusion of the ash, I propose to introduce with the sulphur dioxide gas a substance capable of undergoing an endothermic reaction simultaneously with the reduction of the sulphur dioxide. More particularly, and by way of example, I propose to introduce simultaneously with the sulphur dioxide controlled amounts of carbon dioxide, or a substance yielding carbon dioxide upon decomposition with heat. This carbon dioxide may be derived from any suitable source and may be substantially pure as when produced from limestone, or may be admixed with other gases as in the exit gas from combustion processes. In any event the added gas should contain considerable amounts of carbon dioxide and should be substantially free from uncombined oxygen. The amount of carbon dioxide introduced will obviously vary with the sulphur dioxide content of the gas treated, the type of fuel, the tendency of the fuel ash to fuse and clinker, and the amount of radiation, etc. However, the proper operating temperature may readily be ascertained for any set of conditions by one skilled in the art, and the amount of carbon dioxide introduced will then be regulated to maintain this temperature, which of course in any event should be sufficiently high that reduction of the carbon dioxide to carbon monoxide, and of the sulphur dioxide to elemental sulphur, by the carbonaceous fuel, will take place. If the temperature is too high more carbon dioxide will be added, while if the temperature is too low the amount of carbon dioxide introduced will be decreased. The carbon dioxide introduced readily absorbs the excess heat with the formation of carbon monoxide according to the equation $$CO_2 + C \rightarrow 2CO - 39 \text{ Cal.}$$

and provides a reducing gas which is readily available for the reduction of more sulphur dioxide or for the generation of heat. Instead of adding carbon dioxide directly I may add limestone with the solid fuel, the limestone being decomposed by heat to yield carbon dioxide according to the equation $$CaCO_3 = CaO + CO_2 - 43 \text{ Cal.,}$$

and the carbon dioxide then being reduced by carbon with the further absorption of heat.

The gaseous products from the reduction chamber comprise chiefly nitrogen, carbon monoxide, sulphur vapor, and some hydrogen sulphide and carbonyl sulphide, the proportion of the latter two gases depending upon the amount of moisture in the system. The proportion of carbon monoxide per unit of solid carbonaceous fuel introduced into the reduction chamber will, however, be somewhat greater than when my novel process is not employed. This gas from the reduction chamber having a large reducing value is preferably mixed with a further quantity of sulphur dioxide gas in approximately reacting proportions and burned in a suitable combustion chamber with the production of elemental sulphur according to the equations $$2CO + SO_2 \rightarrow 2CO_2 + S$$
$$2H_2S + SO_2 \rightarrow 2H_2O + 3S$$

Since these reactions are strongly exothermic, the combustion chamber is preferably constructed in such a manner that the heat generated may be utilized for the production of steam, etc., or the hot gas from the combustion chamber may be conducted through a suitable device such as a waste heat boiler whereby the heat is efficiently employed. The reactions for the production of elemental sulphur may be brought to substantial completion by contacting the gaseous products, suitably cooled, with activated bauxite, or with other suitable catalysts, such as iron oxide, titanium oxide, aluminum oxide, etc. The gases after treatment with the catalytic material will be cooled to condense the elemental sulphur and the sulphur collected by any suitable means, as for example a baffle chamber, washer, cloth filter, etc.

The gas leaving the system will contain considerable amounts of carbon dioxide, i. e. at least 16-18%, as well as any carbon monoxide, sulphur dioxide, etc., which did not interact in the reduction process. I have found that it is particularly advantageous to return a controlled amount of this exit gas to the reduction chamber to provide the desired carbon dioxide to regulate the temperature of the reduction process according to my invention. In this method of operation the sulphur dioxide or carbon monoxide present in the exit gas is also recovered and returned to the system.

By way of illustrating my invention the following specific example will be given. A cold gas mixture obtained from the exit of a roasting furnace was found to contain 5% sulphur dioxide, about 14% free oxygen and the balance nitrogen. If this gas mixture be subjected to the reducing action of carbonaceous fuel under commercial conditions, i. e. under the conditions of gas speed and temperature ordinarily employed in the manufacture of producer gas, all the sulphur dioxide is reduced to elemental sulphur, the oxygen both free and combined unites with the carbon forming carbon dioxide which is at once completely reduced to carbon monoxide, and an excess of heat is evolved beyond that required to maintain the operation. This excess of heat if not dissipated soon causes a rise in temperature sufficient to fuse and clinker the ash and to greatly interfere with the smooth and continuous operation of the reduction process. I therefore add to the 5% sulphur dioxide gas undergoing treatment a portion of the exit gas from the system which contains about 19% carbon dioxide and 81% nitrogen in an amount sufficient to absorb the excess heat developed and to maintain the desired temperature for continuous operation. I have found that in order to maintain uniform commercial operating conditions when employing a sulphur dioxide gas of the composition as stated that about 12-13% of the exit gas should be reintroduced into the system with the sulphur dioxide. The carbon dioxide in the returned gas, being reduced by the carbon in the reduction with the absorption of heat thereby utilizes the excess heat otherwise developed and the reduction process is maintained at a predetermined temperature for efficient operation. This carbon monoxide thus produced in the reduction chamber is utilized in a subsequent combustion chamber for the reduction of more sulphur dioxide or for the generation of steam, etc.

Various modifications may be made in the manner of carrying out my invention, and I do not wish to limit the scope thereof except as defined in the appended claims.

I claim:

1. In the process of producing elemental sulphur by the reduction of sulphur dioxide with solid carbonaceous fuel, the step of simultaneously causing an endothermic reaction substantially free from hydrogen in any form whereby the temperature of the reduction process is controlled.

2. In the process of producing elemental sulphur by the reduction of sulphur dioxide with solid carbonaceous fuel, the step of introducing a third substance with the sulphur dioxide and fuel, said substance being substantially free from hydrogen in any form and adapted to cause an endothermic reaction whereby the temperature of the reduction process is controlled.

3. In the process of producing elemental sulphur by the reduction of sulphur dioxide with solid carbonaceous fuel, the step of introducing controlled amounts of carbon dioxide with the sulphur dioxide gas undergoing treatment.

4. In the process of producing elemental sulphur by the reduction of sulphur dioxide with solid carbonaceous fuel, the step of introducing a controlled amount of the exit gas from the system with the sulphur dioxide gas undergoing treatment.

5. The process of producing elemental sulphur from sulphur dioxide gas which comprises mixing a controlled amount of carbon dioxide with the sulphur dioxide, contacting such mixed gas with solid carbonaceous fuel, adding an oxidizing gas containing sulphur dioxide to the gaseous products of the preceding operation to provide approximately interacting proportions of reducing and reducible gases, causing the interaction of such mixed gases, and recovering the elemental sulphur produced.

6. The process of producing elemental sulphur from sulphur dioxide gas which comprises the steps of mixing a controlled amount of carbon dioxide with the sulphur dioxide, contacting such mixed gas with solid carbonaceous fuel, adding an oxidizing gas comprising sulphur dioxide to the gaseous products of the preceding operation to provide approximately interacting proportions of reducing and reducible gases, causing the interaction of said mixed gases, recovering the elemental sulphur produced, and returning a portion of the exit gas to provide the aforementioned carbon dioxide.

7. The process of producing elemental sulphur from sulphur dioxide which comprises the steps of contacting a gas containing sulphur dioxide with solid carbonaceous fuel at a temperature sufficiently high that oxidation of the fuel by the sulphur dioxide will take place, and controlling the temperature of the reduction process by the introduction with the sulphur dioxide of controlled amounts of a gas containing carbon dioxide.

8. In the process of producing elemental sulphur by the reduction of sulphur dioxide gas with carbonaceous fuel the steps of introducing carbon dioxide with the sulphur dioxide gas undergoing treatment, and maintaining a temperature sufficiently high that reduction of the carbon dioxide to carbon monoxide by the carbonaceous fuel will take place.

9. The process of producing elemental sulphur from sulphur dioxide gas which comprises the steps of mixing a controlled amount of carbon dioxide with the sulphur dioxide undergoing treatment, contacting such mixed gas with carbonaceous fuel, maintaining a temperature sufficiently high that reduction of the carbon dioxide to carbon monoxide by the carbonaceous fuel will take place, adding an oxidizing gas comprising sulphur dioxide to the gaseous products of the preceding operation to provide approximately interacting proportions of reducing and reducible gases, causing the interaction of said mixed gases, recovering the elemental sulphur produced, and returning a portion of the exit gas to provide the aforementioned carbon dioxide.

In testimony whereof, I affix my signature.

ALFRED PAUL THOMPSON.